June 9, 1931.  J. S. ACOSTA  1,809,263
BISCUIT, CAKE, AND PIE MACHINE
Original Filed Feb. 13, 1929  5 Sheets-Sheet 3

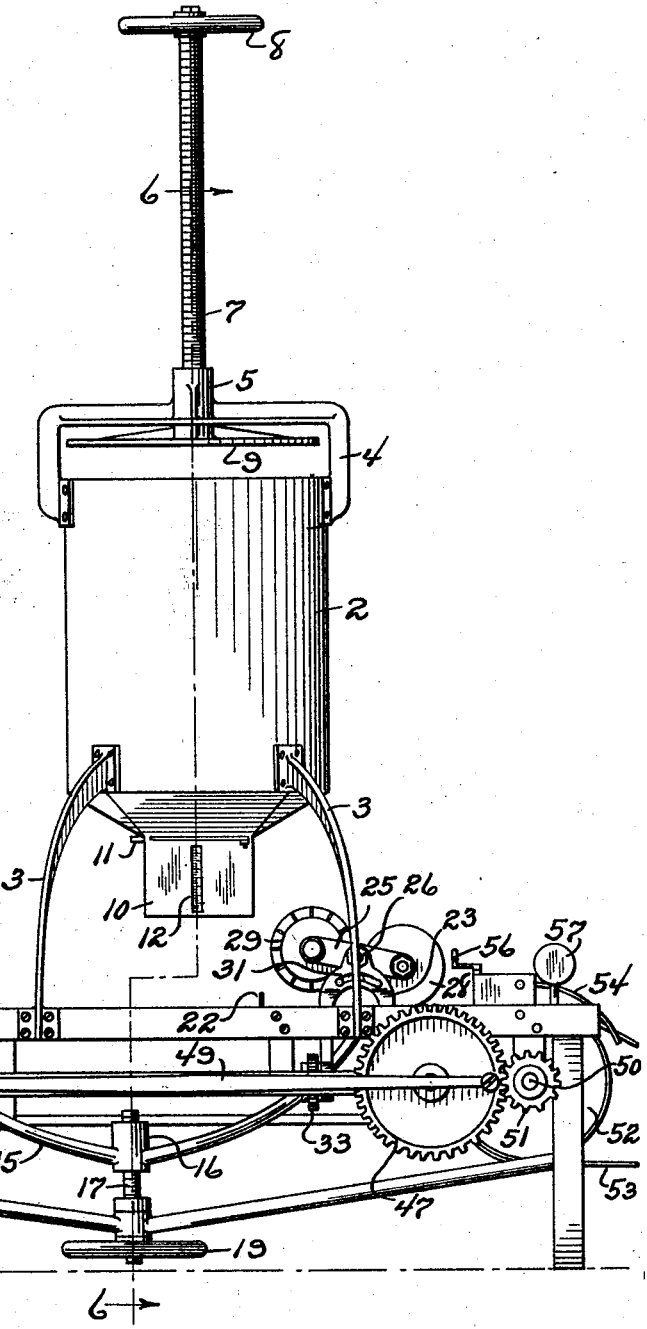

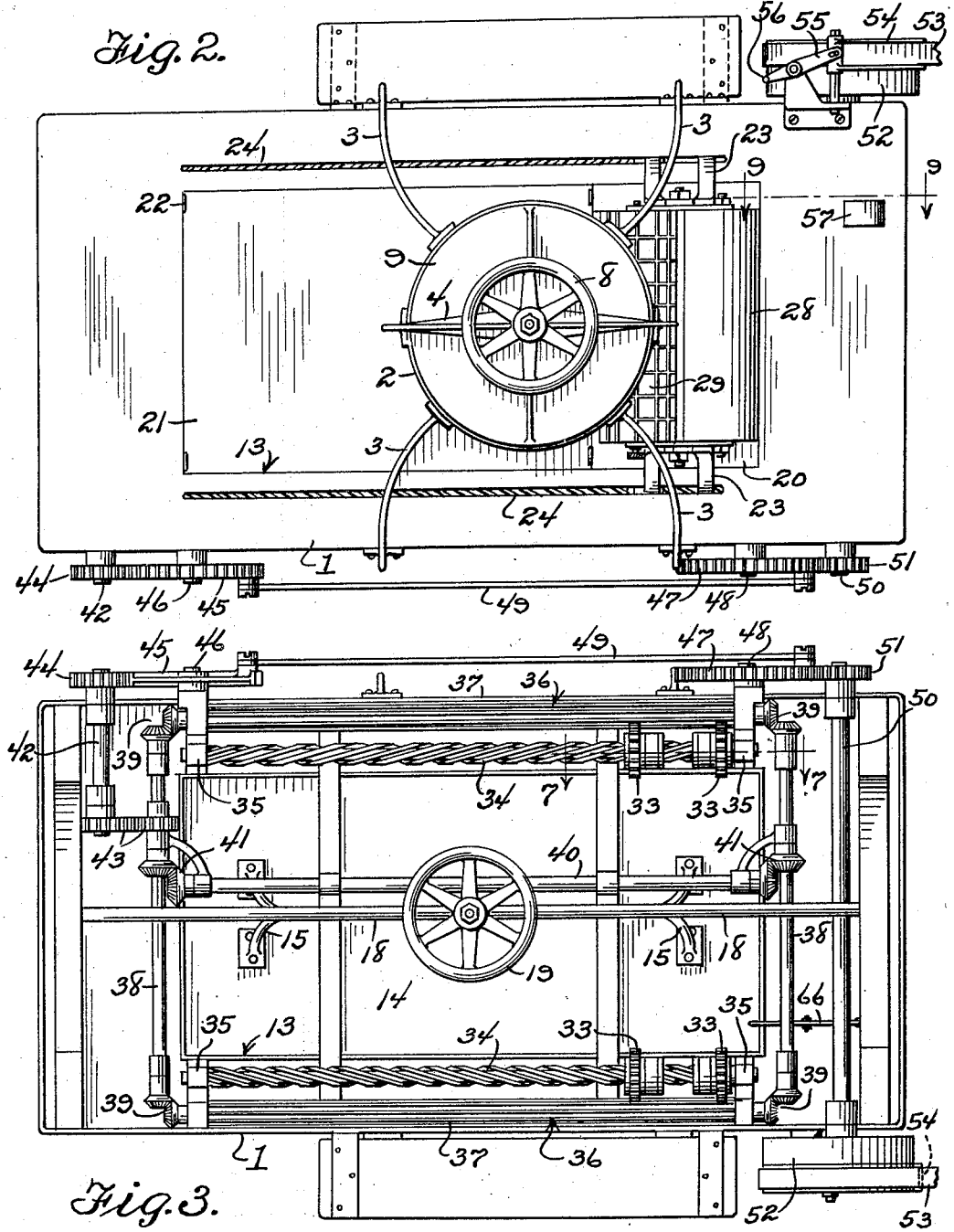

Julian Sanchez Acosta
INVENTOR
BY Victor J. Evans
ATTORNEY

June 9, 1931.  J. S. ACOSTA  1,809,263
BISCUIT, CAKE, AND PIE MACHINE
Original Filed Feb. 13, 1929  5 Sheets-Sheet 4

Julian Sanchez Acosta
INVENTOR

BY Victor J. Evans
ATTORNEY

WITNESS: John Donovan

June 9, 1931. J. S. ACOSTA 1,809,263

BISCUIT, CAKE, AND PIE MACHINE

Original Filed Feb. 13, 1929 5 Sheets-Sheet 5

Julian Sanchez Acosta
INVENTOR

BY Victor J. Evans
ATTORNEY

WITNESS:

Patented June 9, 1931

1,809,263

UNITED STATES PATENT OFFICE

JULIÁN SÁNCHEZ ACOSTA, OF ARECIBO, PORTO RICO, ASSIGNOR OF ONE-THIRD TO LUIS A. WATLINGTON, OF ARECIBO, PORTO RICO

BISCUIT, CAKE AND PIE MACHINE

Application filed February 13, 1929, Serial No. 339,641. Renewed November 8, 1930.

This invention relates to an apparatus for making biscuits, crackers and the like, the general object of the invention being to provide a table, with means above the table whereby measured quantities of dough can be delivered upon the table, with a roller frame supported for reciprocatory movement on the table, said frame carrying a plain roller for rolling the dough and a cutter roller for cutting the dough into various shapes and means for holding one roller in raised position and the other in lowered position so that but one roller will operate on the dough at a time, with power driven means for reciprocating the roller frame across the table.

Another object of the invention is to provide means for adjusting that part of the table on which the dough is placed so as to regulate the thickness of the rolled dough, with means for indicating the thickness.

Another object of the invention is to make the cutter roller removable so that various kinds of cutter rollers can be used with the machine, and also to make the dough carrying part of the table removable so that after the dough has been operated upon by the machine, this part of the table, with the dough thereon, can be removed and another part substituted therefor.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 4:
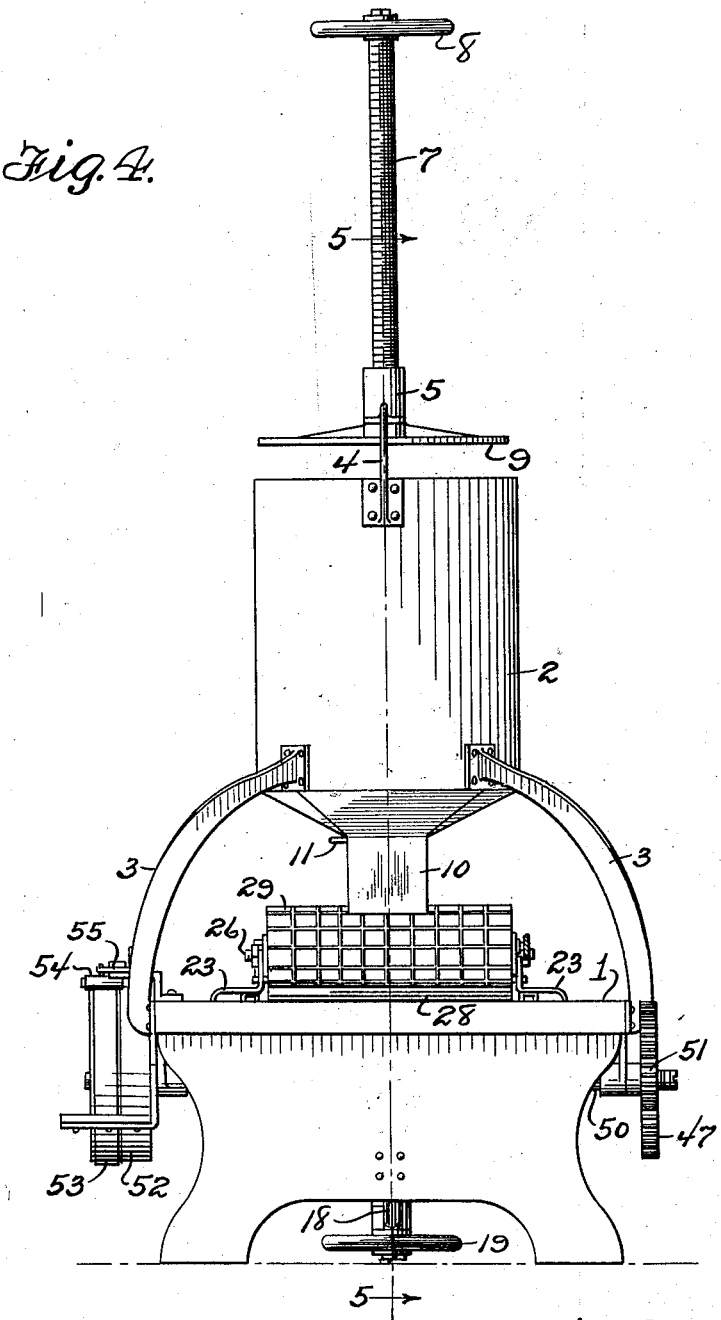
Figure 5:
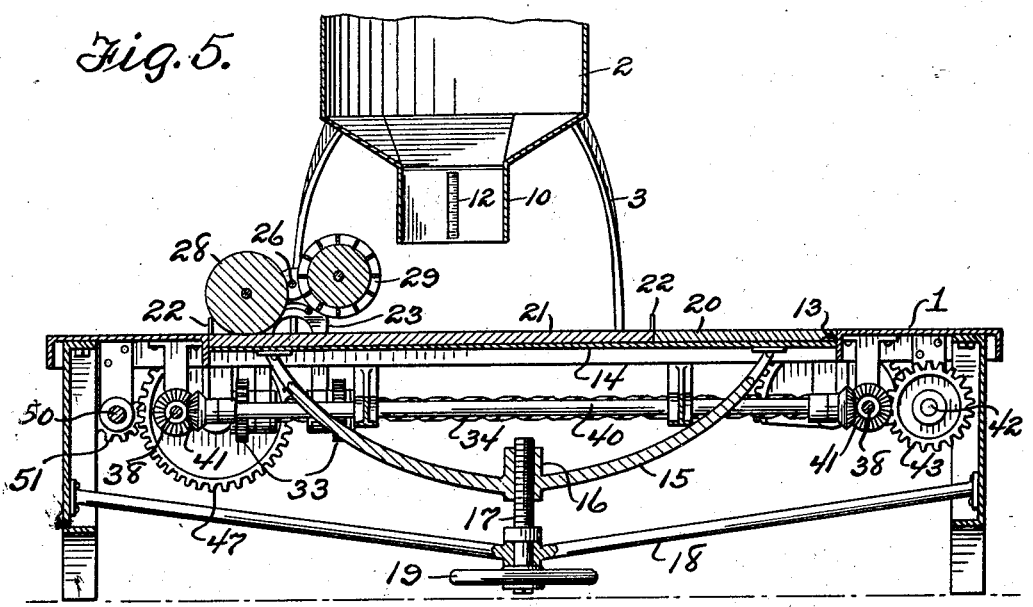
Figure 6:
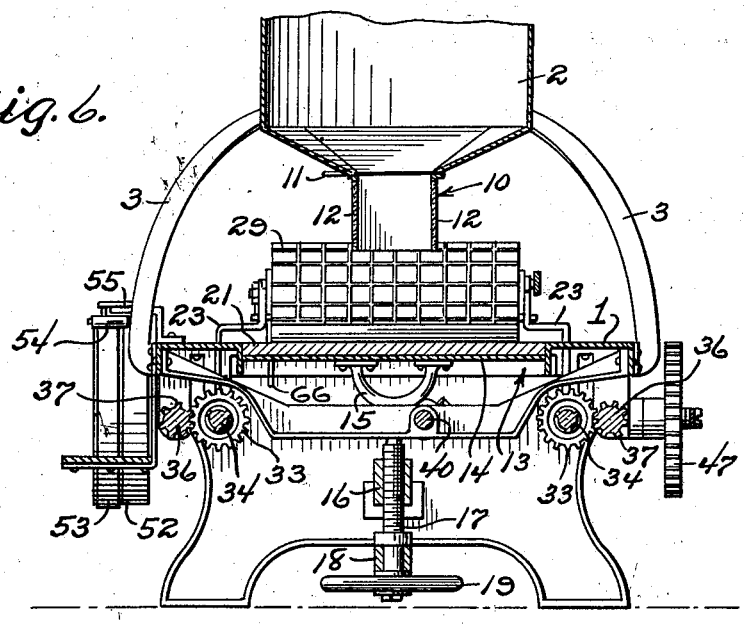
Figure 7:
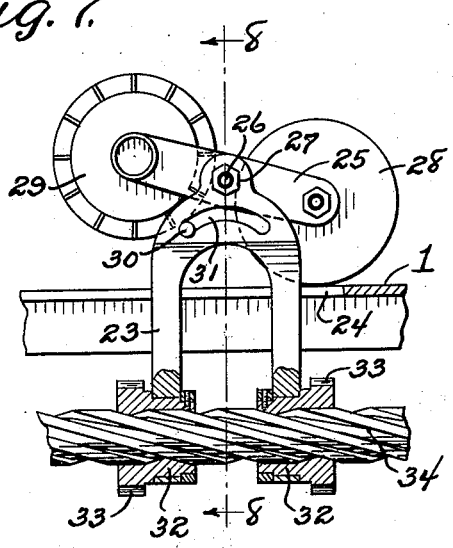
Figure 8:
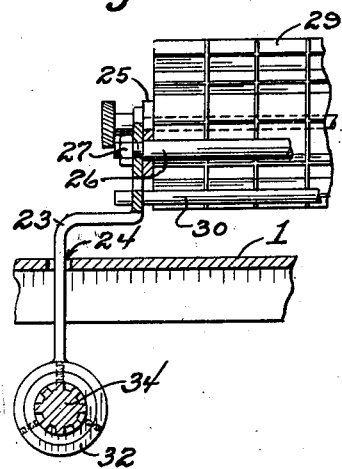
Figure 9:
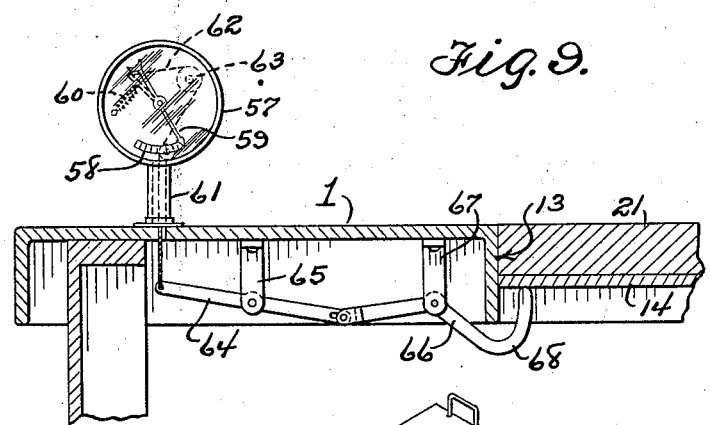
Figure 10:
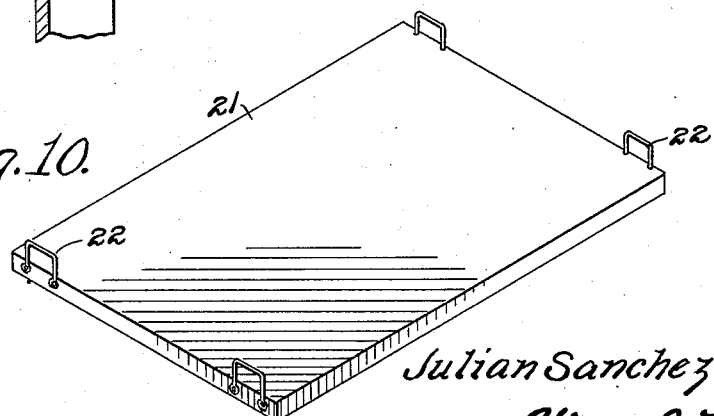

Figure 1 is an elevation of the invention.
Figure 2 is a top plan view thereof.
Figure 3 is a bottom plan view.
Figure 4 is an end view.
Figure 5 is a section on line 5—5 of Figure 4.
Figure 6 is a section on line 6—6 of Figure 1.
Figure 7 is a section on line 7—7 of Figure 3.
Figure 8 is a section on line 8—8 of Figure 7.
Figure 9 is a section on line 9—9 of Figure 2.
Figure 10 is a perspective view of the movable dough board.

In these views, the numeral 1 indicates a table and the numeral 2 indicates a dough receiving hopper which is supported above the table by the curved arms 3 which have their lower ends connected with the sides of the table. A bracket 4 is fastened to the top of the hopper and bridges the same and carries an internally threaded part 5 through which passes a threaded shaft 7 having a handle 8 at its upper end and a piston 9 at its lower end, so that by turning the shaft, the piston will be forced into the hopper to press the dough through the discharge part 10 of the hopper and this dough will drop upon the table. As shown in Figure 1, the piston can be arranged a distance above the upper end of the hopper so that the dough can be placed in the hopper. A knife 11 is arranged in the upper end of the discharge part 10 of the hopper for cutting the dough to separate the dough falling from the hopper from the dough within the hopper, and a gauge 12 is placed in the part 10 so that the operator can determine the amount of dough passing from the hopper.

An opening 13 is formed in the table top and a plate 14 fits snugly in the opening and is vertically movable therein. An arc-shaped piece 15 has its ends fastened to the lower face of the plate and at its center, this piece 15 carries an internally threaded part 16 through which passes a threaded shaft 17 which is rotatably mounted in the center of a frame 18 which has its ends connected with the legs of the table. A hand wheel 19 is connected with the lower end of the shaft so that when this wheel is turned, the shaft will be rotated to move the member 15 and the plate 14 vertically. A plate 20, preferably of wood, is fastened to an end part of the plate 14, and a dough board 21 rests on the other part of the plate 14 and is removable, so that after dough has been rolled and cut on this board, the board, with the dough thereon, can be removed and a new board substituted. The board is provided with handles 22 for facilitating handling of the board.

A pair of inverted U-shaped members 23 is slidably arranged in slots 24 formed in the table top, one at each side of the opening therein, and an arm 25 is pivoted to the upper end of each member through means of a rod 26 which passes through the upper ends of the members 23 and through the central portions of the arms, the ends of this rod being threaded to receive the nuts 27 so that the parts are connected together. This arrangement pivotally supports the arms 25 on the members 23.

A plain roller 28 has each pintle passing through one end of each arm and a cutter roller 29 has each of its pintles passing through the opposite end of each arm. This cutter roller is removably supported by the arms in any suitable manner, so that one cutter roller can be removed and another cutter roller substituted therefor, thus permitting rollers with various shapes of cutters thereon to be used with the device.

A bar 30 has its ends passing through arc-shaped slots 31 formed in the members 23, this bar acting to hold one roller in raised position and the other roller in lowered position, as shown in Figure 7, which shows the plain roller in lowered position and the cutter roller in raised position. By shifting the bar 30 to the opposite ends of the slots, the roller 28 will be held in raised position and the roller 29 in lowered position.

A nut member 32 is rotatably arranged in the lower end of each limb of each member 23, each member carrying a gear 33 and the nut members of each member 23 engage a spirally threaded shaft 34 which is held against rotary movement at each side of the table and underneath the same by the brackets 35. As will be seen from Figure 3, the threads of the two shafts 34 are oppositely arranged.

A shaft 36 is arranged at each side of the table underneath the top thereof and is supported for rotary movement in the brackets 35, these shafts 36 being parallel with the shafts 34 and arranged between the shafts 34 and the outer sides of the table top. Each shaft 36 is formed with long longitudinally extending teeth 37 which mesh with the teeth of the gears 33, so that as the shafts 36 rotate, they will impart rotary movement to the nut members 32 through means of the gears 33, and this rotary movement of the nut members on the spiral shafts 34 will cause such members and the members 23 to travel along the spiral shafts. As will be seen, the teeth 37 on the shafts 36 are of such a length that they will remain in mesh with the gears while the nut members are traveling from one end of each spiral shaft to the opposite end thereof.

A pair of cross shafts 38 is supported for rotary movement under the table top and these cross shafts are connected with the ends of the shafts 36 by the beveled gears 39. A shaft 40 is also located under the table top at about the center thereof, and this shaft 40 is connected by the beveled gears 41 with the cross shafts 38. A driven shaft 42 is journaled under the table top and is connected with one of the shafts 38 by the gears 43. The outer end of the shaft 42 has a pinion 44 thereon which meshes with a segmental gear 45 carried by a stub shaft 46 and a large gear 47 carried by a stub shaft 48 is connected with the segmental gear by the connecting rod 49.

A power shaft 50 carries a pinion 51 which meshes with the gear 47, this power shaft being rotatably supported under the table, adjacent one end thereof, and loose and fast pulleys 52 are arranged on that end of the shaft 50 which is opposite that end which carries the pinion 51. A belt 53 is adapted to engage either one of these pulleys, the belt passing over a pulley on a motor or the like from which the apparatus is driven. A belt shifter 54 engages the belt and is operated by a lever 55 provided with a handle 56, so that by shifting the lever, the belt can be placed over either the fast pulley or the loose pulley.

From the foregoing it will be seen that when the power shaft 50 is in operation, the gear 47 will be rotating and this rotary movement will be imparted to the segmental gear 45 through means of the rod 49 whereby the gear 45 is given a movement first in one direction and then in the opposite direction. This movement of the segmental gear will be communicated to the shaft 42, which in turn will rotate the shafts 38 and the shaft 40 so that the shafts 36 are rotated to cause the nut members to move the roller carrying parts across the dough board and then, as the members are reversed by the reverse movement of the segmental gear, the roller carrying parts will return to their first position, this position being over the stationary plate 20. Thus after the operator places a proper amount of dough on the dough board from the hopper, he shifts the belt to the fast pulley so that the power means will operate the roller carrying parts to cause the plain roller to pass back and forth over the dough to roll the same to the proper thickness, this thickness being determined by the position of the plate 14 and the dough board in relation to the roller, which is in operative position. Then after the dough has been properly rolled, the rollers are reversed so as to bring the cutter roller into operative position and then when this roller passes over the dough, its knives will cut the dough into shapes which correspond to the designs of the knives on the roller. As before stated, by using a cutter roller of the proper design, the dough can be cut into any desired design. After this operation is finished, the dough board 21 with the dough thereon, can be removed and a new board substituted.

I also provide a gauge for indicating the thickness of the sheet of dough to be rolled, according to the position of the plates 14 and the dough board, this gauge comprising a casing 57 having a transparent front on which graduations 58 are placed, with a finger 59 in the casing for cooperating with the graduations, this finger being normally held at zero by the spring 60. The casing is supported from the table by a hollow post 61 and a flexible member 62 is connected with a part of the finger and passes over a pulley 63 in the casing, through the post and is connected to a lever 64 pivoted intermediate its ends to a hanger 65 carried by the table, and this lever is connected to a second lever 66 pivoted intermediate its ends to a hanger 67 on the table, said lever having a bent part 68 which engages the under side of the plate 14.

Thus the spring 60 will hold the parts with the bent end of the lever 66 engaging the plate 14 so that the vertical movement of the plate 14 will cause movements of the levers and the cable and thus the finger will be moved over the graduations and indicate the thickness of the sheet of dough rolled on the board, with the plate 14 and the dough board in a certain position.

It will be seen that the capacity of the machine is attained by the length given to the dough board, and therefore, to the reciprocating frame, as the rollers will roll, cut and design as much dough as is placed in the rolling space.

After the operator has reduced the dough to the thickness desired, as indicated by the gauge, he will bring the rollers into their first position or the opposite position. He will then raise the member 15, the plate 14 and the dough board 21 by turning the lower hand wheel so as to bring the said dough board 21 to coincide with the level of the plate 20, in which position the finger of the gauge will be marking zero. It will be seen that the elevation of the sheet of dough upon the table at this time will be the thickness of said sheet of dough, in which case a special cutter roller with blades, punches and designs of such thickness (the thickness of the layer of dough) is used. When the blades have entered into the said material, it accommodates and takes the forms and designs arranged in the upper walls. This is especially intended when the dough is to be punched and designed at the same time of cutting it into the desired product.

The rollers will be so arranged that when the dough board 21 is level with the plate 20, in which position the gauge will be marking zero, the rollers will be as close as possible to the board, but not cutting or scratching it.

If the machine is constructed to a considerable height, a platform projecting downwardly from the inner side of the table, with a step plate at its lower end will be provided so as to give access to the operator when the hand wheel is in its highest point.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An apparatus of the class described comprising a table, a roller carrying frame slidably supported by the table, means for reciprocating the frame, a pair of rollers carried by the frame, one roller being plain and the other having cutting knives thereon, means for holding one roller in lowered or operative position while the other is in raised or inoperative position, whereby the plain roller will roll dough placed on the table into a sheet and the cutter roller will cut the sheet into designs, a dough hopper supported above the table, a pressure member for forcing dough from the hopper, cutting means for separating the dough passing from the hopper from the dough in the hopper and a gauge for indicating the amount of dough passing from the hopper.

2. An apparatus of the class described comprising a table having an opening therein, a vertically movable member arranged in the opening, manually operated means for moving said member, a dough board removably seated on said member, a roller carrying frame slidably arranged in the table, a pair of rollers carried thereby for engaging dough placed on the dough board, one roller being plain and the other having cutters thereon, means for holding either roller in lowered or operative position while the other roller is in raised or inoperative position and power means for reciprocating the roller frame.

3. An apparatus of the class described comprising a table having an opening therein, a vertically movable member arranged in the opening, manually operated means for moving said member, a dough board removably seated on said member, a roller carrying frame slidably arranged in the table, a pair of rollers carried thereby for engaging dough placed on the dough board, one roller being plain and the other having cutters thereon, means for holding either roller in lowered or operative position while the other roller is in raised or inoperative position, power means for reciprocating the roller frame and means for indicating the position of the vertically movable member for determining the thickness of the sheet of dough rolled on the board.

4. An apparatus of the class described comprising a table having an opening therein, a vertically movable member arranged in the opening, manually operated means for moving said member, a dough board removably seated on said member, a roller carrying frame slidably arranged in the table, a pair of rollers carried thereby for engaging dough placed on the dough board, one roller being plain and the other having cutters thereon, means for holding either roller in lowered or operative position while the other roller is in raised or inoperative position, power means for reciprocating the roller frame, means for indicating the position of the vertically movable member for determining the thickness of the sheet of dough rolled on the board, a dough hopper supported from the table above the dough board, manually operated means for forcing dough from the hopper, a cutter for separating the dough passing from the hopper from the dough in the hopper and a gauge for indicating the amount of dough passing from the hopper.

5. An apparatus of the class described comprising a table having an elongated slot adjacent each side thereof, a roller frame having end portions passing through the slots, nut members rotatably carried by the lower ends of said end portions, stationary shafts under the table having spiral threads thereon with which the nut members engage, a shaft arranged adjacent each spiral shaft and having elongated teeth thereon, gears on the nut members engaging said teeth, power means for driving the last mentioned shafts, first in one direction and then in an opposite direction to reciprocate the roller carrying frame on the table, a pair of rollers carried by the upper part of the frame and means for holding either roller in lowered or operative position and the other roller in raised on inoperative position.

6. An apparatus of the class described comprising a table having an elongated slot adjacent each side thereof, a roller frame having end portions passing through the slots, nut members rotatably carried by the lower ends of said end portions, stationary shafts under the table having spiral threads thereon with which the nut members engage, a shaft arranged adjacent each spiral shaft and having elongated teeth thereon, gears on the nut members engaging said teeth, cross shafts carried by the table and geared to the last mentioned shafts, a centrally arranged shaft carried by the table and geared to the cross shafts, a stub shaft geared to one of the cross shafts, a pinion on said stub shaft, a segmental gear meshing with the pinion, a large gear, a connecting bar connecting the large gear with the segmental gear, a power shaft, a pinion thereon meshing with the large gear, a pair of rollers carried by the upper part of the frame and means for holding either roller in lowered or operative position and the other roller in raised or inoperative position.

7. An apparatus of the class described comprising a table having an elongated slot adjacent each side thereof, a roller frame having end portions passing through the slots, nut members rotatably carried by the lower ends of said end portions, stationary shafts under the table having spiral threads thereon with which the nut members engage, a shaft arranged adjacent each spiral shaft and having elongated teeth thereon, gears on the nut members engaging said teeth, cross shafts carried by the table and geared to the last mentioned shafts, a centrally arranged shaft carried by the table and geared to the cross shafts, a stub shaft geared to one of the cross shafts, a pinion on said stub shaft, a segmental gear meshing with the pinion, a large gear, a connecting bar connecting the large gear with the segmental gear, a power shaft, a pinion thereon meshing with the large gear, a pair of rollers carried by the upper part of the frame, means for holding either roller in lowered or operative position and the other roller in raised or inoperative position, said table having an opening therein, a vertically movable member in the opening, manually operated means for moving said member, a dough board removably seated on said member and over which the rollers will pass during their reciprocatory movement, a hopper supported by the table over the dough board, means for pressing dough from the hopper, means for separating the dough passing from the hopper from the dough in the hopper, means for indicating the amount of dough passing from the hopper, means for indicating the position of the vertically movable member and the dough board for determining the thickness of the sheet of dough rolled on the board and means whereby cutter rollers of various designs can be placed in the roller frame.

In testimony whereof I affix my signature.

JULIÁN SÁNCHEZ ACOSTA.